(12) United States Patent
Waldner (10) Patent No.: US 6,861,993 B2
(45) Date of Patent: Mar. 1, 2005

(54) MULTI-LOOP ANTENNA FOR RADIO-FREQUENCY IDENTIFICATION

(75) Inventor: Michele A. Waldner, Minneapolis, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/378,458

(22) Filed: Mar. 3, 2003

(65) Prior Publication Data

US 2004/0100413 A1 May 27, 2004

Related U.S. Application Data

(60) Provisional application No. 60/429,282, filed on Nov. 25, 2002.

(51) Int. Cl.[7] ............................................. H01Q 11/12
(52) U.S. Cl. ..................... 343/742; 343/867; 340/572.5
(58) Field of Search ......................... 343/700 MS, 741, 343/742, 743, 744, 866, 867, 873; 340/10.2, 570, 572.5

(56) References Cited

U.S. PATENT DOCUMENTS

| | | | |
|---|---|---|---|
| 4,260,990 A | 4/1981 | Lichtblau | 343/742 |
| 4,782,345 A | 11/1988 | Landt | 343/727 |
| 5,142,292 A | 8/1992 | Chang | 343/742 |
| 5,602,556 A | 2/1997 | Bowers | 343/742 |
| 5,808,587 A | 9/1998 | Shima | 343/395 |
| 5,940,043 A * | 8/1999 | Canipe et al. | 343/742 |
| 5,977,875 A * | 11/1999 | Lin et al. | 340/570 |
| 6,037,879 A | 3/2000 | Tuttle | 340/825.54 |
| 6,043,792 A | 3/2000 | Finlayson | 343/867 |
| 6,107,920 A | 8/2000 | Eberhardt et al. | 340/572.7 |
| 6,127,928 A | 10/2000 | Issacman et al. | 340/572.1 |
| 6,160,526 A | 12/2000 | Hirai et al. | 343/895 |
| 6,164,551 A | 12/2000 | Altwasser | 235/492 |
| 6,173,900 B1 | 1/2001 | Yoshigi et al. | 235/492 |
| 6,459,588 B1 | 10/2002 | Morizumi et al. | 361/737 |
| 6,522,308 B1 | 2/2003 | Mathieu | 343/895 |
| 2002/0044096 A1 | 4/2002 | Chung | 343/742 |
| 2002/0180588 A1 * | 12/2002 | Erickson et al. | 340/10.2 |
| 2002/0196126 A1 * | 12/2002 | Eisenberg et al. | 340/10.2 |

FOREIGN PATENT DOCUMENTS

| | | | |
|---|---|---|---|
| DE | 92 17 070 | 4/1993 | |
| DE | 200 12 099 | 12/2000 | ............ H01Q/7/00 |
| EP | 0 829 921 B1 | 6/2001 | ............ H01Q/7/00 |
| JP | 2001 292018 | 10/2001 | |
| WO | 98/05088 | 2/1998 | ............ H01Q/1/38 |
| WO | 98/31070 | 7/1998 | ........... H01Q/11/12 |

OTHER PUBLICATIONS

Carr, Joseph J., "Practical Antenna Handbook", 3rd Edition, pp. 291–297 and 307–309, 1998.

The ARRL Handbook for Radio Amateurs—The Standard in Applied Electronics and Communications, 2001, pp. 20.36–20.39 and 20.68–20.69, 2000.

"Multi–Loop Antenna For Radio Frequency Identification (RFID) Communication," filed Feb. 20, 2004, Ser. No. 10/784,124.

"Field–Shaping Shielding For Radio Frequency Identification (RFID) System," filed Feb. 20, 2004, Ser. No. 10/784,109.

"Radio Frequency Identification Tags With Compensating Elements", filed Mar. 23, 2004, Ser. No. 10/807,072.

"Variable Frequency Radio Frequency Identification (RFID) Tags," filed Apr. 8, 2004, Ser. No. 10/820,584.

* cited by examiner

Primary Examiner—Hoang V. Nguyen
(74) Attorney, Agent, or Firm—Melissa E. Buss (57) ABSTRACT

The invention provides a multi-loop antenna that produces an electromagnetic field having a magnitude of at least an interrogation threshold of a tag for a substantial portion of an interrogation region located in a plane parallel to the antenna. The antenna may include a plurality of loops, including one or more powered loops and one or more parasitic loops. The parasitic loops receive power from mutual coupling with the powered loops causing current to flow within the parasitic loops, which contributes to the profile of the magnetic field. As a result, each parasitic loop may be tuned to provide control over the magnitude of the electromagnetic field. The powered loops and the parasitic loops may be varied over the interrogation period to reduce any area of the interrogation region where the magnitude of the field remains below the interrogation threshold throughout the interrogation period. The powered loops and the parasitic loops may reside on a single layer or may be arranged on multiple layers.

44 Claims, 9 Drawing Sheets

MULTI-LOOP ANTENNA FOR RADIO-FREQUENCY IDENTIFICATION

This application claims priority from U.S. Provisional Application Ser. No. 60/429,282, filed Nov. 25, 2002, the entire content of which is incorporated herein by reference.

GOVERNMENT LICENSE RIGHTS

This invention was made with Government support under Agreement No. NMA202-97-9-1050 awarded by the National Imagery and Mapping Agency. The Government has certain rights in the invention.

TECHNICAL FIELD

The invention relates to the use of radio frequency identification systems for document and file management and, more specifically to radio frequency antennas for radio frequency identification systems.

BACKGROUND

Radio-Frequency Identification (RFID) technology has become widely used in virtually every industry, including transportation, manufacturing, waste management, postal tracking, airline baggage reconciliation, and highway toll management. A typical RFID system includes RFID tags, an RFID reader having an antenna, and a computing device. The RFID reader includes a transmitter that may provide energy or information to the tags, and a receiver to receive identity and other information from the tags. The computing device processes the information obtained by the RFID reader. In general, the information received from the tags is specific to the particular application, but often provides identification for an item to which the tag is fixed, which may be a manufactured item, a vehicle, an animal or individual, or virtually any other tangible article. Additional data may also be provided for the article. The tag may be used during a manufacturing process, for example, to indicate a paint color of an automobile chassis during manufacturing or other useful information.

The transmitter outputs RF signals through the antenna to create an electromagnetic field that enables the tags to return an RF signal carrying the information. A conventional tag may be an "active" tag that includes an internal power source, or a "passive" tag that is energized by the field.

The transmitter makes use of an amplifier to drive the antenna with a modulated output signal. Once energized, the tags communicate using a pre-defined protocol, allowing the RFID reader to receive information from one or more tags. The computing device serves as an information management system by receiving the information from the RFID reader, and performing some action, such as updating a database or sounding an alarm. In addition, the computing device serves as a mechanism for programming data into the tags via the transmitter.

SUMMARY

In general, the invention relates to a multi-loop antenna for producing an electromagnetic field for radio-frequency identification. The antenna may be, for example, embedded within a "smart storage area" of an RFID system. As described in detail, the smart storage areas may be equipped with multi-loop antennas to produce electromagnetic fields, and RFID interrogation capability to aid in tracking and locating documents or files within the system. The RFID interrogation capability of smart storage areas may read RFID tags associated with the items stored in the respective storage areas. Examples of smart storage areas include a shelving unit, a cabinet, a vertical file separator, a smart cart, a desktop reader, or a similar location.

Embodiments of the multi-loop antenna may be used in many RFID applications, such as the smart storage areas, in which tags may be oriented perpendicular to the antenna. In order to provide reliable communications, it is desirable to create as large an electromagnetic field as possible in a direction perpendicular to any RFID tags associated with items within the storage areas, and within an "interrogation region" located in a plane above and parallel to the antenna. The embodiments produce magnetic fields that have magnitudes that meet or exceed a minimum interrogation threshold needed to energize tags for a substantial portion of the interrogation region, and in a direction perpendicular to the antenna.

In one embodiment of the invention, an antenna comprises a plurality of loops. The loops are oriented to produce an electromagnetic field having a magnitude of at least an interrogation threshold of a tag for a substantial portion of an interrogation region located in a plane parallel to the antenna. One or more of the loops may be selectively powered over an interrogation period, with the remaining loops being parasitic loops. The parasitic loops receive power via mutual coupling with the powered loops causing current to flow within the parasitic loops, which contributes to the profile of the magnetic field. The driven loops and the parasitic loops may be varied over the interrogation period to substantially reduce any area of the interrogation region where the magnitude of the field remains below the interrogation threshold throughout the interrogation period. During the interrogation period, for example, a first set of the loops may be powered and RFID communications may be initiated. This process may be repeated for any combination of the loops during the interrogation period.

In another embodiment, an antenna comprises a plurality of concentric loops formed in a common plane, e.g., within a single layer of a printed-circuit board. The printed-circuit board may be used within one of the smart storage areas, e.g., embedded within a base of a vertical file or within a shelf. The antenna may include any number of concentric loops, such as 3, 5, 10, 15, 20, or more concentric loops. As one example, the antenna may comprise a plurality of loops in which an outer and an inner loop may be powered over the interrogation period, and the remaining loops may be parasitic loops. In particular, the outer and inner loop may be alternatively powered during the interrogation period such that the magnitude of the field over the interrogation period meets or exceeds the interrogation threshold of a tag for a substantial portion of an interrogation region located above and parallel to the antenna.

In another embodiment, an antenna comprises a plurality of loops formed in respective layers of a printed-circuit board. Two powered loops may reside on a top layer, and two additional powered loops may reside on a bottom layer. One or more parasitic loops may reside within a layer between the top layer and the bottom layer. The three layers may be used to form a printed-circuit board for use within one of the storage areas. The loops may be non-concentric, and may overlap in direction perpendicular to the printed-circuit board.

In another embodiment, a system comprises a storage area to store items having associated radio frequency identification tags, and a multi-loop antenna proximate the storage area to produce an electromagnetic field. The system further comprises a radio frequency identification reader coupled to the antenna to selectively power at least one of the loops of the antenna without powering the remaining loops to communicate with the radio frequency identification tags.

In a further embodiment, the invention is directed to a method comprising selectively powering at least one loop of a multi-loop antenna without powering the remaining loops to produce an electromagnetic field proximate to a storage area during an interrogation period, and obtaining information during the interrogation period from one or more radio frequency identification tags fixed to items within the storage area.

Although the various aspects of the present invention will largely be described in the context of files or documents or both, the invention may be used in tracking other items including books, video tapes, optically-recorded media, or retail items, pallets, containers, or other assets, as appropriate, whether or not each of these items is specifically called out as an alternative application.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
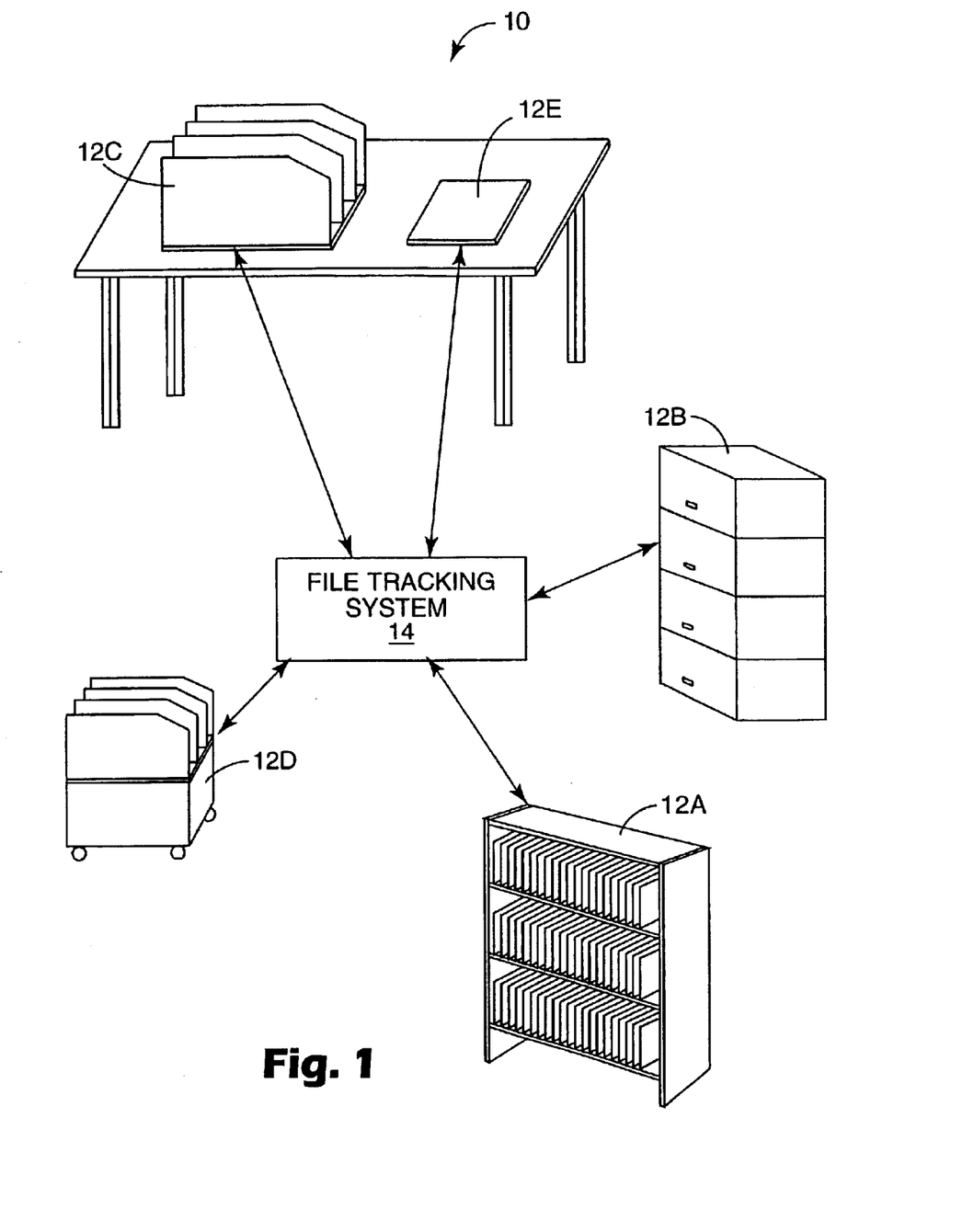
FIG. 1 is a block diagram illustrating a radio frequency identification (RFID) system for document and file management.

FIG. 1 is a block diagram illustrating a radio frequency identification (RFID) system 10 for document and file management. Despite some interest in converting offices to paperless environments in which paper documents are entirely replaced by electronic versions of those documents, a number of industries continue to rely heavily on paper documents. Examples include law offices, government agencies, and facilities for storing business, criminal, and medical records. These files may be positioned in a number of "smart storage areas" 12, e.g., on an open shelf 12A, a cabinet 12B, a vertical file separator 12C, a smart cart 12D, a desktop reader 12E, or a similar location, as shown in FIG. 1.

In this manner, smart storage areas 12 may be provided at multiple locations within an organization, as opposed to in a single file room. For example, a smart storage area 12 may be associated with a particular location, e.g., a docketing shelf, and thus may be referred to or considered to be "dedicated" shelves. As also described below, smart storage areas 12 could be located near individual offices or other areas in, for example, a hospital or clinic, a law firm, an accounting firm, a brokerage house, or a bank, to enable files to be tracked not only when they are located in a central file room, but also when they are located at distributed locations.

The term "smart storage area" is used generally to refer to a storage area for a document or other item that is equipped with RFID interrogation capability to aid in tracking and locating documents or files within system 10. In particular, the RFID interrogation capability of smart storage areas 12 may read RFID tags associated with the items stored in the respective storage areas. In other words, RFID tags may be associated with or applied to items of interest. The tag may even be embedded within the item or the packaging of the item so that the tag is at least substantially imperceptible, which can help to prevent detection and tampering. Thus it would be possible to "source-mark" items with an RFID tag, such as inserting an RFID tag into or applying an RFID tag to an item during its manufacture, as with a file folder, document, book, or the like.

RFID tags or labels are made by various manufacturers, including Texas Instruments of Dallas Tex., under the designation "Tag-it." One type of RFID tag is a combination tag that includes an RFID element and a magnetic security element. An RFID tag typically includes an integrated circuit with a certain amount of memory, a portion of which may be used to write certain information to the tag, and another portion of which may be used to store additional information to the tag. The integrated circuit is operatively connected to an antenna that receives RF energy from a source and also backscatters RF energy in a manner well known in the art. It is this backscattered RF energy that provides a signal that may be received by an interrogator, commonly referred to as a reader, within file tracking system 14 to obtain information about the RFID tag, and the item with which it is associated.

RFID system 10 operates within a frequency range of the electromagnetic spectrum, such as 13.56 MHz, with an allowable frequency variance of +/−7 kHz, which is often used for Industrial, Scientific and Medical (ISM) applications. However, other frequencies may be used for RFID applications, and the invention is not so limited.

The RFID interrogators or reader pads of smart storage areas 12 communicate position information to file tracking system 14 that provides a central data store, e.g., within one or more databases of a relational database management system (RDBMS), for aggregation of the position information. File tracking system 14 may be networked or otherwise coupled to one or more computers so that individuals at various locations can access data relative to those items.

Collection and aggregation of the position information may be useful for a number of purposes. For example, a user may request the location of a particular item or group of items, such as a file or a group of books. File tracking system 14 may retrieve the file location information from the data store, and report to the user the last location at which the items were located within one of the storage areas. Optionally, the system can re-poll or otherwise re-acquire the current location of the item to verify that the item is in the location indicated in the database.

As another example, file-tracking system 14 may notify a user when an item is placed at a certain location and is ready for use. For example, an attorney may be notified that a file is ready for review and recently placed at his or her desk. Naturally, file tracking system 14 could be applied to legal files stored in court rooms or court houses, and used by court personnel such as judges, clerks, and the like. Similarly, if patient files are located in a designated area, a medical professional may be notified (perhaps through a cellular telephone or a pager, or by e-mail) that the file (and perhaps the person to whom the file relates) is ready for review.

The fact that the file was located at a certain location awaiting further processing can be recorded by file tracking system 14 as part of a history of the location of that item. Note that a certain file located on a certain shelf or other storage location, on which a certain person is expected to work, is different than a storage room containing a large group of files (perhaps) awaiting work by any person within a group or organization. Stated differently, the certain shelf having a certain file for a certain person is specific to that person, whereas a general file room housing all files for all members of a group is not specific to anyone.

In addition, the information collected by RFID system 10 may be useful in tracking, for example, cycle time in processes, efficiency of one or more people who work with the files, and efficiency of the process. This information can also provide a type of location archive if the information is maintained within the software system.

Each of the smart storage areas 12 of system 10 may be equipped with one or more antennas for interrogating the files to aid in determining which files are located at each of the storage areas. For example, one or more antennas are positioned within open shelve 12A to create an electromagnetic field for communicating with the RFID tags associated with the files. Similarly, antennas may be located within cabinet 12B, vertical file separator 12C, smart cart 12D, desktop reader 12E, and the like. The antennas may be positioned in various ways, such as on top or bottom of each shelf, at the back of the shelves, or supported vertically, interspersed among the files. The antennas can be retrofitted to existing shelves or built into a shelf and purchased as a unit.

Each smart storage area 12 may include an antenna control system to energize the antennas to interrogate, or poll, the RFID tags. If polling is performed continuously, a controller within the antenna control system may include a circuit for multiplexing signals through multiple antennas sequentially. The antenna control system may cause the antennas to interrogate portions of the smart storage area 12 in a predetermined order. The antenna control system may include one or more nodes, i.e. subcontrollers, that control a subset of antennas. The number, location, and other characteristics of the antennas associated with a given node may be determined by the user. For example, if it is desired to poll the shelves quickly, more nodes may be added to the system. Another approach is for the user to configure or customize the antenna control system so that nodes or portions of the smart storage area 12 may be configured to poll in a sequence specified by the user. For example, if one portion of a smart storage area 12 is unavailable for use at certain times, then the RFID tags in that area need not be interrogated during those times.

As described in detail herein, the antenna or antennas used within each of smart storage areas 12 may be designed to develop magnetic fields of at least certain strengths within "interrogation regions" over the storage areas. This may be advantageous for one or more reasons, including improving the accuracy of file detection throughout the interrogation regions of a given smart storage area 12. The magnetic field created by the antenna is used to power the tags associated with the items within the smart storage area 12, and the amount of energy induced in each tag is proportional to the strength of the magnetic field passing through the tag loop. Advantageously, the antenna may be utilized to produce a field having a magnitude over the interrogation period that exceeds a threshold magnitude for energizing an RFID tag. Moreover, the magnitude may meet or exceed an interrogation threshold, such as 115 dBuA/m, for energizing tags throughout a substantial portion of the interrogation region. For example, by selecting different driven and parasitic loops of the antenna, the field produced may have a magnitude substantially throughout the interrogation region that exceeds the threshold magnitude for 50%, 75%, 90%, 99%, or more of the area of the interrogation region. In this manner, antenna 30 may be utilized to more accurately detect and communicate with tags associated with items within a smart storage area 12. Consequently, the techniques described herein can improve the likelihood that all or substantially all of the tags associated with the files or documents positioned within the storage areas can be energized, and the items can be successfully detected.

Figure 2:
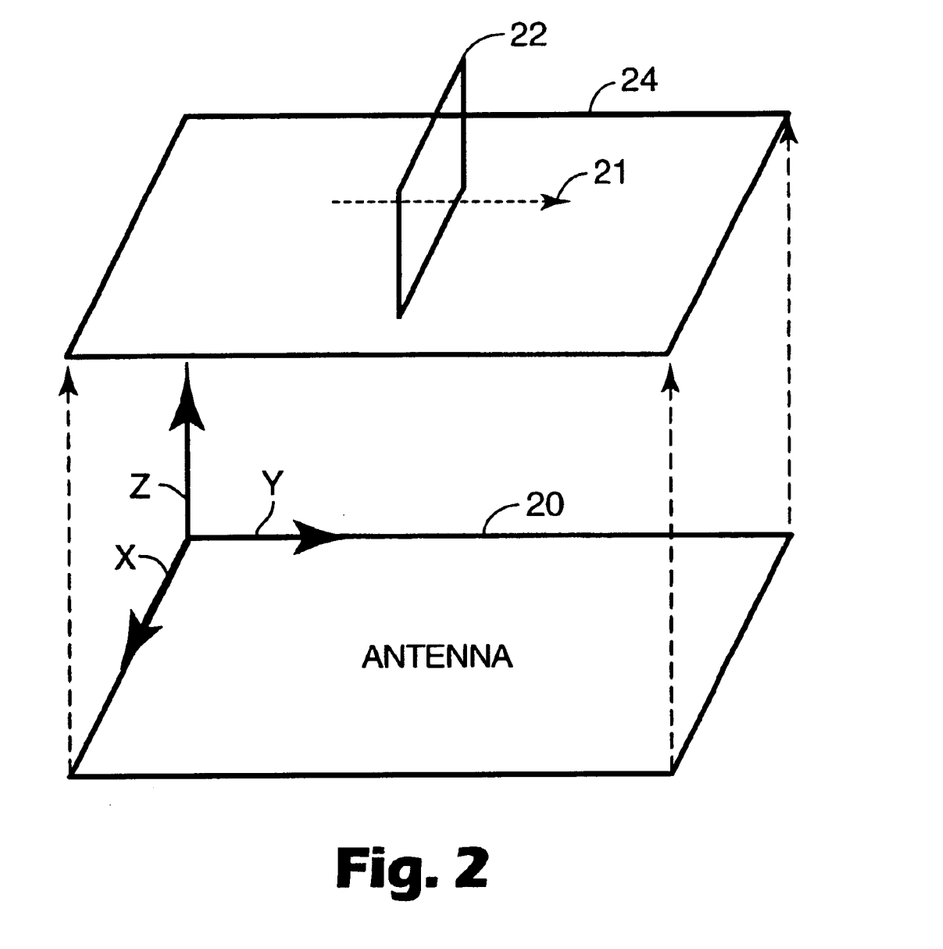
FIG. 2 is a perspective diagram illustrating an example orientation for an antenna of an RFID reader relative to a tag associated with a document or file.

FIG. 2 is a perspective diagram illustrating an example orientation for an antenna 20 of an RFID reader relative to a tag 22 associated with an item located within one of smart storage areas 12. In many RFID applications, such as the smart storage areas 12 of RFID system 10, it is often advantageous to create as large an electromagnetic field as possible in a direction perpendicular to tag 22, as indicated by the dotted arrow 21, and within an interrogation region 24 located in a plane above and parallel to antenna 20. In particular, the field should have a magnitude that meets or exceeds a minimum interrogation threshold needed to energize the tag throughout a substantial portion of interrogation region 24 in the direction primarily perpendicular to tag 22 in order to provide reliable communications throughout the interrogation region.

Unlike many RFID applications in which an RFID reader and a tag may be parallel and aligned on top of each other, antenna 20 and tag 22 within a smart storage area 12 may necessarily be oriented perpendicular to each other. In particular, for ease of installation and other reasons, antenna 20 may be located within or along a respective base or shelving structure of a smart storage area 12, and the documents or items may be stored vertically. For example, one or more antennas 20 may be located within the shelves of open shelf 12A. Similarly, one or more of antennas 20 may be located within a base of vertical file separator 12C. Files or documents within these storage areas 12, however, are typically arranged vertically. As a result, tag 22 associated with one of the items tends to be oriented perpendicular to antenna 20, and may be located a distance z above antenna 20 of the reader. Further, tag 22 may be positioned anywhere over the area occupied by antenna 20, depending upon the position of the associated item. For example, tag 22 may be located near either end of shelf 12A, or anywhere in between.

A conventional single-loop RFID antenna may be unable to produce an electromagnetic field that meets or exceeds the minimum interrogation threshold in a direction perpendicular to tag 22 substantially throughout plane 24. In particular, a single loop RFID antenna may produce a field having peaks in field strength directly over the loop, and a significant drop in the center of the antenna. As a result, conventional single-loop RFID antennas may be less accurate or unworkable in that they may fail to detect a number of items within the storage area. As described herein, each of smart storage areas 12 utilizes one or more multi-loop antennas capable of producing a magnetic field that meets or exceeds an interrogation threshold for energizing tags throughout the smart storage area.

Figure 3:
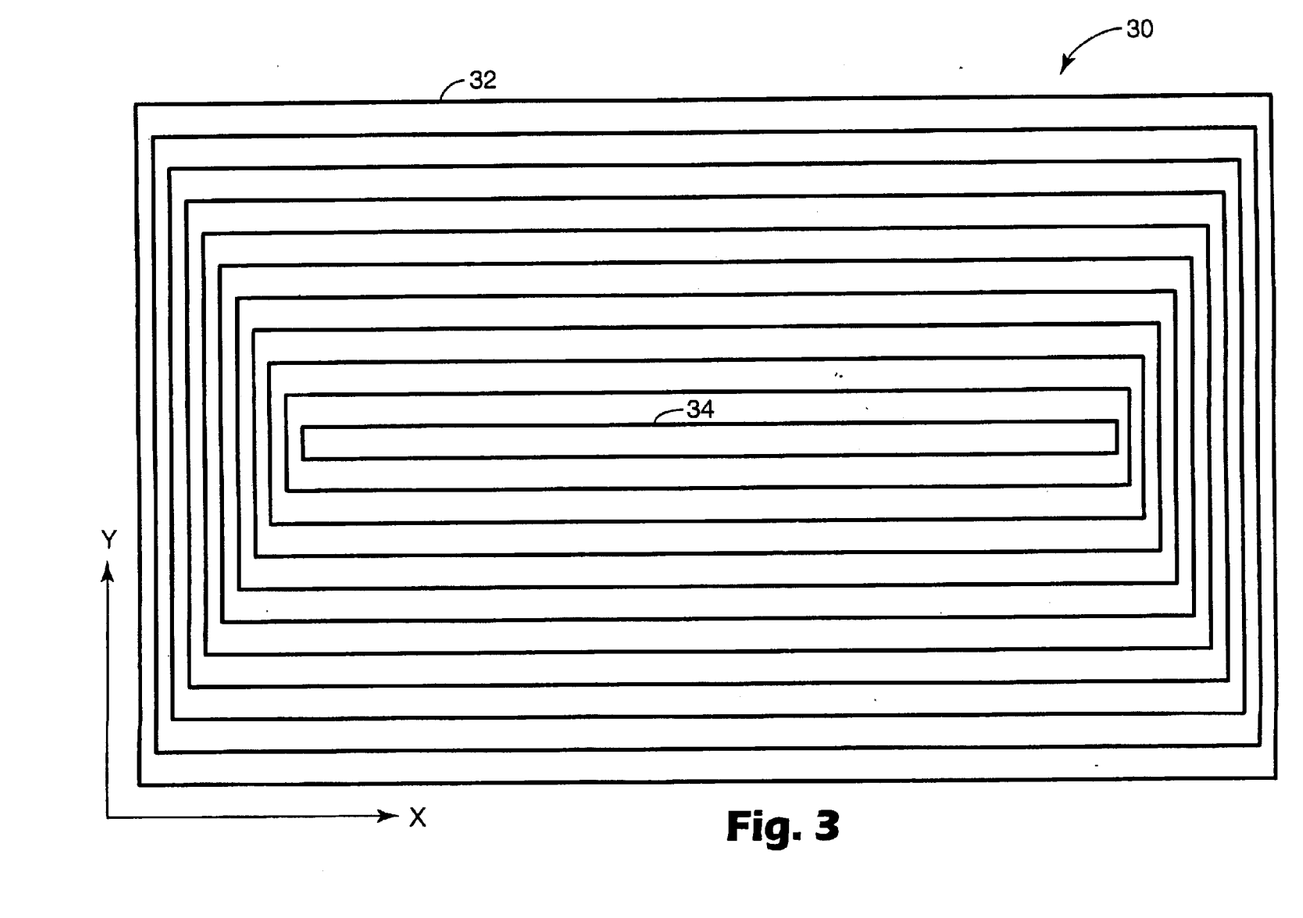
FIG. 3 is a schematic diagram of one example embodiment of a multi-loop antenna.

FIG. 3 is a schematic diagram of one example embodiment of a multi-loop antenna 30. In particular, antenna 30 is capable of producing an electromagnetic field in which a magnitude of the field meets or exceeds a minimum interrogation threshold in a direction perpendicular to an orientation of a tag within an interrogation region located above and parallel to the antenna. In particular, antenna 30 includes a plurality of concentric loops formed that are planar with one another, i.e., reside in one or more parallel planes.

Antenna 30 includes one or more "powered" loops and one or more "parasitic" loops to reduce any area of the interrogation region where the magnitude of the field remains below the interrogation threshold throughout the interrogation period. Furthermore, any number of the loops of antenna 30 may be selectively powered to form a field that, over an interrogation period, exceeds a minimum interrogation threshold in an interrogation region located in a plane parallel to and above the antenna. During the interrogation period, a first set of the loops may be powered and a RFID communication may be initiated. This process may be repeated for any combination of the loops during the interrogation period.

Each loop may comprise a discrete trace, wire, or other conductive path suitable for current flow. In addition, one or more loops may be made from a single, continuous trace or wire. As one example, the loops may be formed from one or more traces within a printed circuit board or other rigid or flexible substrate. Each trace may be, for example, 100 to 150 millimeters in width. Multiple antennas 30 may be located adjacent to each other within a single smart storage area 12 to ensure the electromagnetic field spans the entire storage area.

In general, the parasitic loops receive power via mutual coupling with the driven loops causing current to flow within the parasitic loops, which contributes to the profile of the magnetic field. As a result, each parasitic loop may be tuned to provide fine control over the magnitude of the electromagnetic field. In accordance with the principle of field superposition, the ultimate field produced by antenna 30 at any point during the interrogation interval is based on the contributions of all the loops. Consequently, the driven loops and the parasitic loops may be selected to finely control the magnetic field along a dimension of antenna 30, e.g., the X direction in FIG. 3. Further, the powered loops and parasitic loops of antenna 30 may be varied during the interrogation period to form a field having a magnitude that meets or exceeds the interrogation threshold for a substantial portion of the interrogation region in a direction perpendicular to an orientation of tags within the interrogation region.

In one embodiment, antenna 30 may include any number of loops, such as three, five, ten, fifteen, twenty, or more concentric loops. Outer loop 32 may measure approximately 12 inches in the X direction, and 8 in the Y direction. Moreover, the loops of antenna 30 may be arranged to have a spacing of approximately 0.4 inches on center between each loop.

Outer loop 32 and an inner loop 34 of antenna 30 may be powered, and all of the other inner loops may be parasitic elements, i.e., passive elements. The parasitic loops may be tuned to resonant at a frequency to allow maximum current flow in each of the parasitic loops, which in turn creates the magnetic field strength needed in an interrogation region located within a plane parallel to and above antenna 30. As one example, a powered loop may be driven at 13.56 MHz, for example, and a parasitic loop may be tuned to resonate at a frequency of ±0.5 MHz from this base frequency.

In addition, the non-overlapping, concentric loops of antenna 30 may be formed in a common plane, e.g., within a single layer of a printed-circuit board for use within a base or shelf of a smart storage area 12. Although described in general with respect to a horizontal position, the invention is not so limited, and antenna 30 may be oriented differently depending on the particular RFID application.

Further, although the embodiment of FIG. 3 is used as an example, other variations may be used to create fields having different profiles. For example, any combination of driven and parasitic loops may be used. Furthermore, antenna 30 may easily be modified to use one or more different geometric shapes, such as parallelograms, and by removing, shorting, angling, or driving selected loops, the desired electromagnetic field profile can be obtained.

Figure 4A:
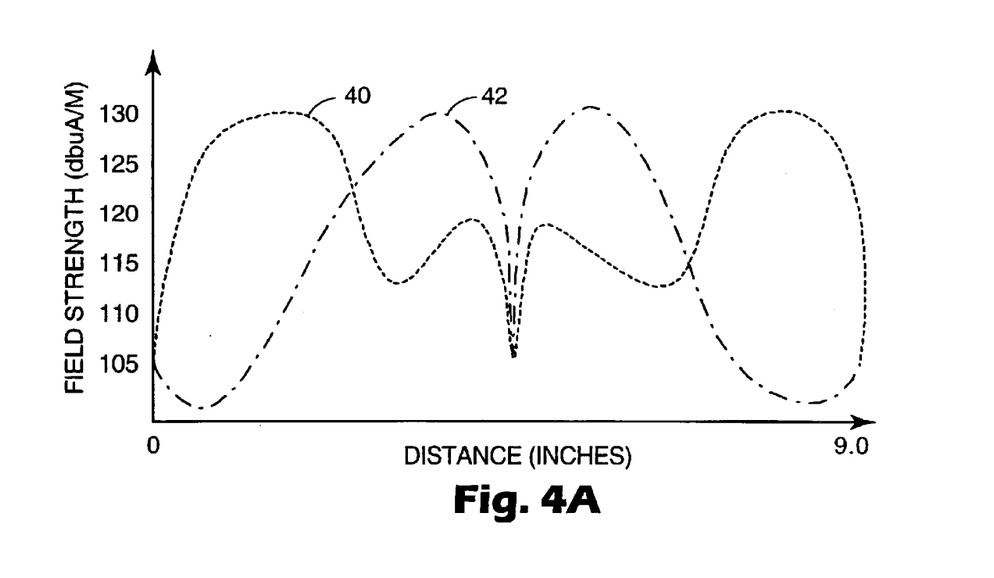
FIG. 4A is a graph that illustrates the magnitudes of example magnetic fields produced by selectively powering different loops of the antenna of FIG. 3.

FIG. 4A is a graph that illustrates the magnitude of example magnetic fields 40, 42 formed by selecting different driven and parasitic loops of antenna 30 (FIG. 3). Specifically, FIG. 4A illustrates the magnitude of an X-directed magnetic field sweeping along the X direction of a smart storage area 12 with Y and Z distances held constant. In this example, the magnitude of the magnetic field strength was measured using a Hewlett Packard model HP11941A close-field probe, which has an antenna factor, at the measured frequency of 10 MHz equal to 39 dB (uA/m/uV).

In the illustrated example, an outer loop 32 (FIG. 3) and an inner loop 34 of antenna 30 are powered at different times during the interrogation interval to produce electromagnetic fields 40 and 42, respectfully. All of the other inner loops are used as parasitic loops throughout the entire interval. As illustrated by the example, each driven loop 32, 34 and the remaining parasitic loops create respective magnetic fields 40, 42 that exhibit significant reduction in magnitude in different points along the X dimension of antenna 30. By selectively powering loops 32, 34 over an interrogation period, the magnitude of the fields produced by antenna 30 may be enhanced to substantially reduce any area of the interrogation region where the magnitude of the fields remains below the interrogation threshold throughout the interrogation period.

Figure 4B:
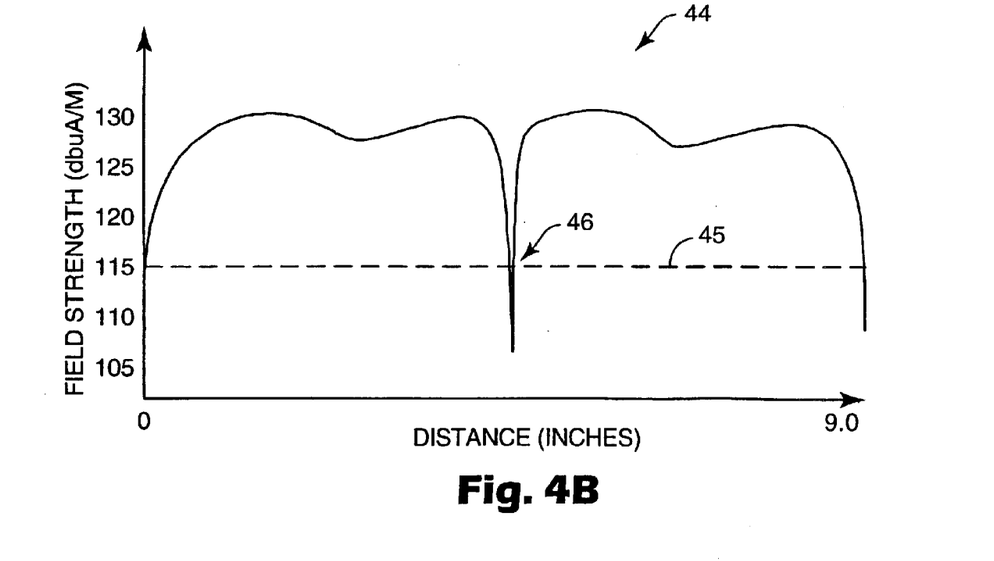
FIG. 4B is a graph that illustrates the magnitude of the magnetic fields of FIG. 4A over an interrogation period during which the loops are selectively powered.

FIG. 4B is a graph that illustrates the magnitude of the magnetic fields 40, 42 of FIG. 4A formed over an interrogation period during which loops 32, 34 are selectively powered. As illustrated, over the interrogation period, selectively powered loops 32, 34 and the parasitic loops of antenna 30 form a field 44 having a magnitude that meets or exceeds a minimum interrogation threshold in an interrogation region parallel to the antenna, and in a direction perpendicular to an orientation of a tag within the interrogation region.

Advantageously, antenna 30 may be utilized to produce field 44 having a magnitude over the interrogation period that exceeds a threshold interrogation magnitude, such as 115 dBuA/m, to energize an RFID tag and provide reliable communications substantially throughout an interrogation region above antenna 30. For example, by selecting different driven and parasitic loops of antenna 30, field 44 may be produced that exceeds the threshold interrogation magnitude for 50%, 75%, 90%, 99% or more of the area of the interrogation region in a direction perpendicular to an orientation of a tag within the interrogation region. For example, within the interrogation region and in a direction perpendicular to an orientation of the tag, field 44 exhibits a single dip 46 in which the magnitude falls below exemplary threshold 45. However, in this example, field 44 falls below threshold 45 for a very narrow region. In particular, dip 46 in field 44 may have a width of 0.1 inches, or 0.08 inches, or less at threshold 45. In this manner, antenna 30 may be utilized to more accurately detect and communicate with tags associated with items within a smart storage area 12.

Figure 4C:
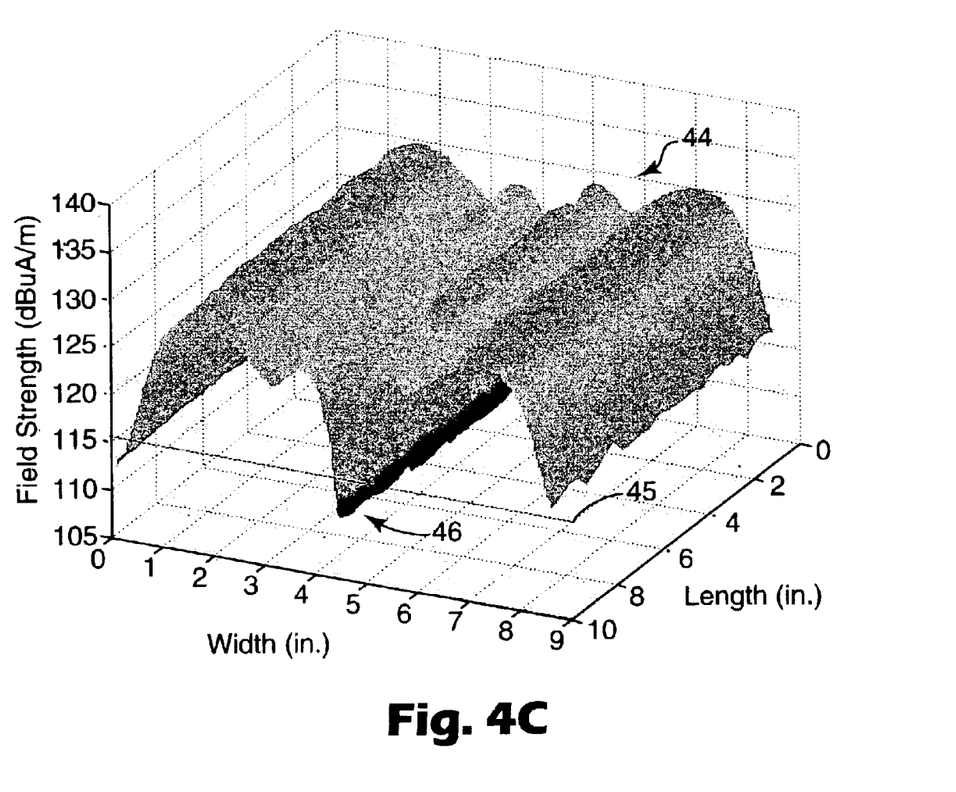
FIG. 4C is a three-dimensional graph that illustrates the magnitude achieved by magnetic fields of FIG. 4A over an interrogation period.

FIG. 4C is a graph that provides a three-dimensional view of the magnitude of the magnetic field 44 of FIG. 4B. As illustrated by FIG. 4C, field 44 is generally formed in an interrogation region above antennae 30, and exceeds threshold 45 for a substantial portion of the interrogation region. In this example, FIG. 4C illustrates the magnitude of field 44 measured in an interrogation region 0.75 inches above antenna 30.

Figure 5:
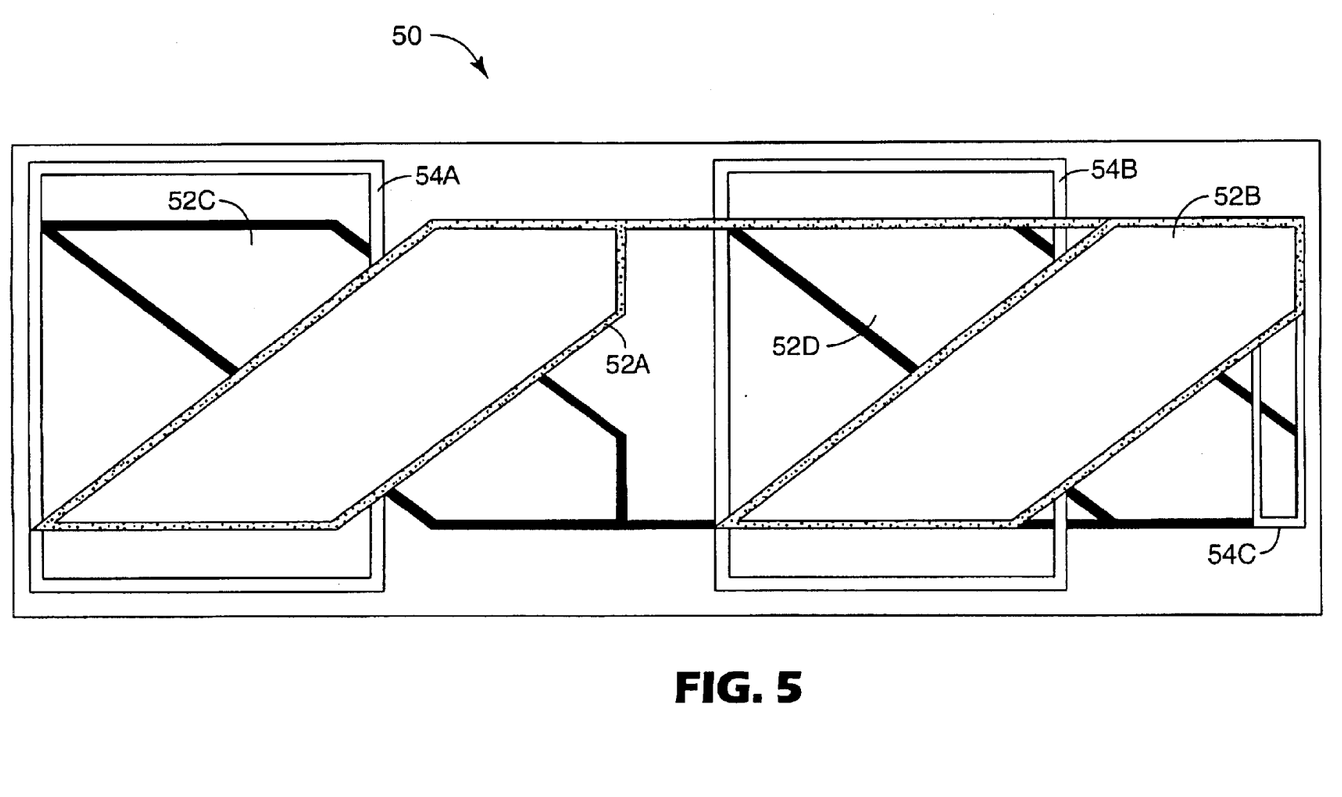
FIG. 5 is a plan view of another exemplary multi-loop antenna.

FIG. 5 is a plan view of another exemplary multi-loop antenna 50. Multi-loop antenna 50 includes multiple loops residing on multiple layers. More particularly, antenna 50 includes sets of powered loops 52A–52D ("52") and parasitic loops 54A–54C ("54") that reside on respective layers. A first set of powered loops 52A and 52B reside on a top layer and a second set of powered loops 52C and 52D reside on a bottom layer. Parasitic loops 54 reside on a middle layer between the top layer and the bottom layer. Each set of powered loops 52 may be selectively driven with a power source, such as a current source, in order to create a magnetic field. When only one of the sets of powered loops 52 are driven, the loops of the other set act as parasitic loops. As with the exemplary antenna 30 of FIG. 3, powered loops 52 and parasitic loops 54 are arranged such that the magnetic fields produced by the loops reduces any area of the interrogation region where the magnitude of the field remains below the interrogation threshold throughout the interrogation period.

More specifically, an electromagnetic coupling between powered loops 52 and parasitic loops 54 induces a current in parasitic loops 54 and, in turn, a magnetic field associated with parasitic loops 54. The magnetic field created by parasitic loops 54 further enhances the magnetic field in areas in which the magnetic field created by the combination of powered loops 52 drops.

Although the example described in FIG. 5 includes powered loops 52A–52D and parasitic loops 54A–54C residing on three layers, antenna 50 may include any number of powered loops 52 and parasitic loops 54 residing on any number of respective layers. Antenna 50 may also have powered loops 52 and parasitic loops 54 arranged in a number of ways, including having a portion of powered loops 52 residing on the same layer as parasitic loops 54. Further, powered loops 52 and parasitic loops 54 may be constructed in shapes other than the shapes illustrated in FIG. 5.

Antenna 50 may be constructed, for example, on a multilayer printed circuit board using any of a number of fabrication techniques including chemical vapor deposition, sputtering, etching, photolithography, masking, and the like. Alternatively, printing techniques may be used to deposit conductive traces on dielectric layers of the printed circuit board.

Figure 6:
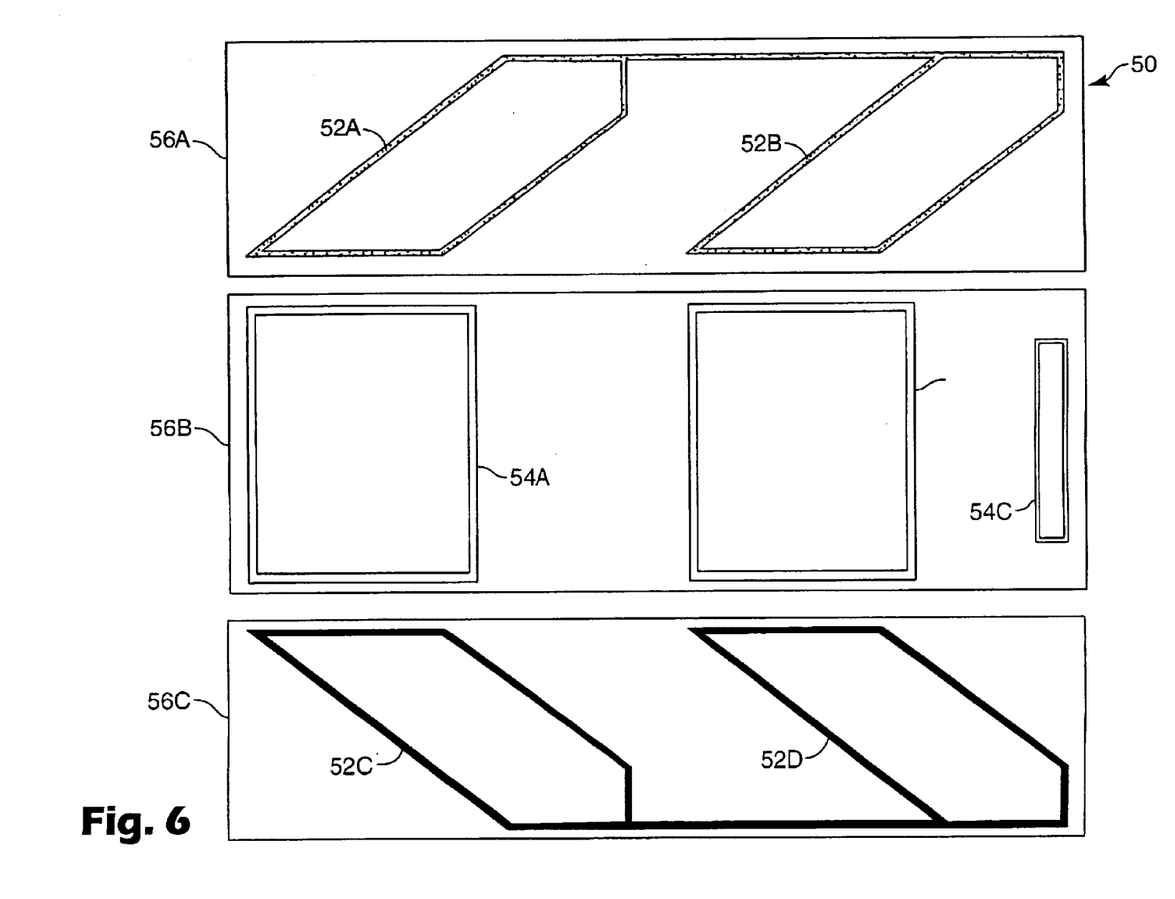
FIG. 6 is an exploded view of the example antenna of FIG. 5.

FIG. 6 is an exploded view of antenna 50 of FIG. 5. As described above, antenna 50 comprises three layers 56A–56C ("56"). Layers 56 may, for example, be layers of a printed circuit board. Layer 56A comprises powered loops 52A and 52B, layer 56B comprises parasitic loops 54A–54C, and layer 56C comprises powered loops 52C and 52D.

As described above, layers 56 may be arranged in several different fashions. For instance, layer 56A and 56C may be interchanged such that layer 56C is a top layer of antenna 50 and layer 56A is a bottom layer. Further, one or more layers may be interspersed between any of layers 56. Powered loops 52 and parasitic loops 54 may also be arranged in several fashions. For example, any one of layers 56 may comprise only driven loops 52, only parasitic loops 54, or a combination of parasitic loops 54 and driven loops 52.

Figure 7:
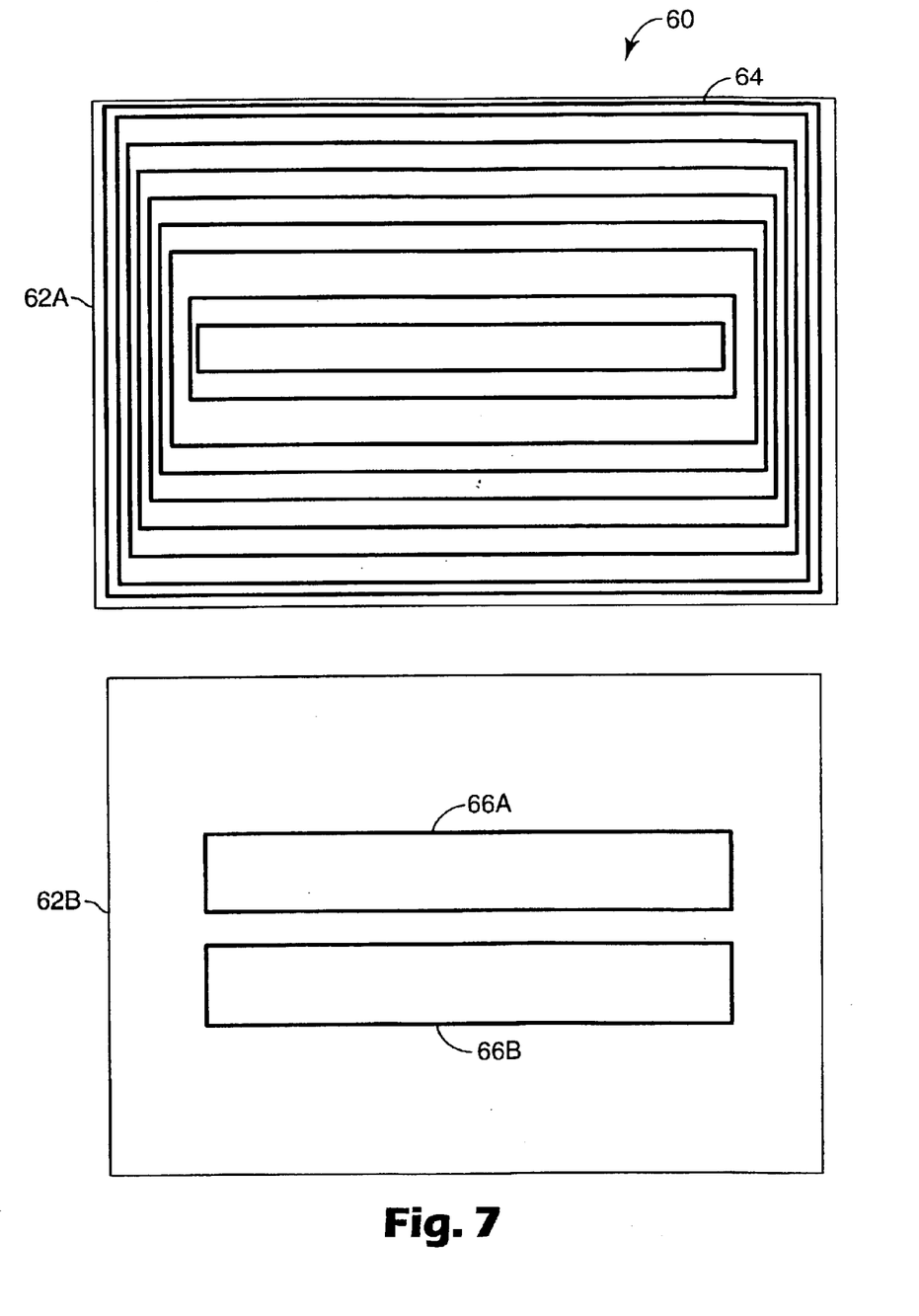
FIG. 7 is a plan view of another exemplary multi-loop antenna

FIG. 7 is a plan view of another exemplary multi-loop antenna 60. Multi-loop antenna 60 includes multiple loops residing on multiple layers 62A–62B ("layers 62"). More particularly, layer 62A includes a plurality of concentric loops, including at least one powered loop 64 and a number of parasitic loops to enhance the magnitude of the field across the interrogation region above antenna 60. Layer 62B includes additional parasitic loops 66A–66B ("parasitic loops 66"). Each loop of antenna 60, parasitic or powered, may comprise a discrete trace, wire, or other conductive path suitable for current flow. In addition, one or more loops may be made from a single, continuous trace or wire. As one example, the loops may be formed from one or more traces within a printed circuit board.

Powered loop 64 is driven with a power source in order to create a magnetic field. The other loops of antenna 60, i.e., the other loops of layer 62A and parasitic loops 66 of layer 62B, act as parasitic loops to enhance the magnetic field of antenna 60 as described above. The parasitic loops may be tuned to resonate at a frequency to allow maximum current flow in each of the parasitic loops, which in turn creates the magnetic field strength needed to produce a field that exceeds a minimum interrogation threshold for a substantial portion of an interrogation plane parallel to antenna 60.

In the example illustrated in FIG. 7, a single loop, e.g., outer loop 64 of layer 62A, may be powered such that the powered loop and the remaining parasitic loops generate a magnetic field that meets or exceeds the interrogation threshold in a direction perpendicular to an orientation of tags within the interrogation region above antenna 60. In other words, multiple loops need not necessarily be selectively powered during an interrogation period to achieve the field. Nevertheless, the embodiment of FIG. 7 is for exemplary purposes, and one or more loops may be powered selectively or in combination to produce a magnetic field with the remaining parasitic loops.

Layers 62 may be arranged in different fashions. For example, layer 62A may be a top layer of antenna 60. Alternatively, layer 62A may be the bottom layer of antenna 60. Further, one or more layers may be interspersed between layers 62A and 62B.

Figure 8A:
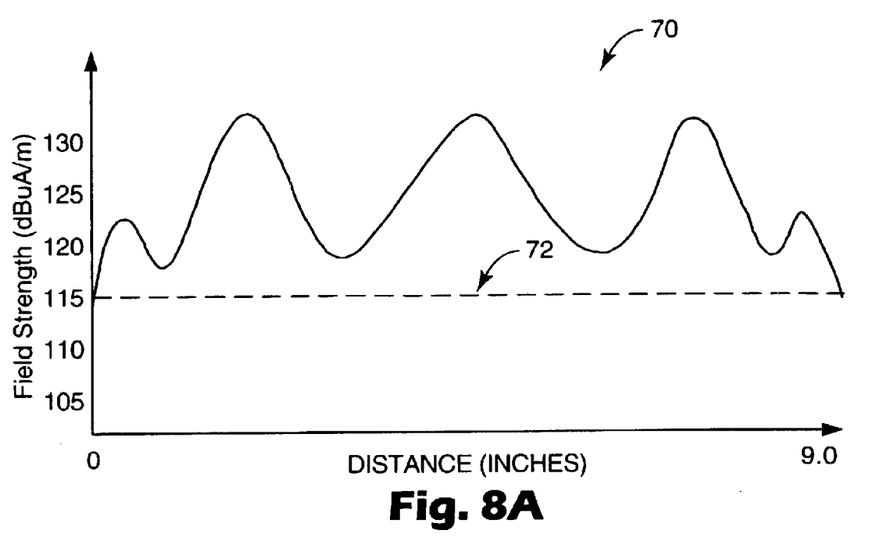
FIG. 8A is a graph that illustrates the magnitude of an example magnetic field produced by the multi-loop antenna of FIG. 7.

FIG. 8A is a graph that illustrates the magnitude of a magnetic field 70 created by the antenna 60 of FIG. 7. In particular, FIG. 8A is a two dimensional graph that illustrates the magnitude of the magnetic field along a dimension, e.g., width, of antenna 60 when outer loop 64 is powered. As illustrated, loop 64 and the remaining parasitic loops of antenna 60 form a field 70 having a magnitude that meets or exceeds an example threshold 72 for energizing a tag for a substantial portion of an interrogation region above antenna

Figure 8B:
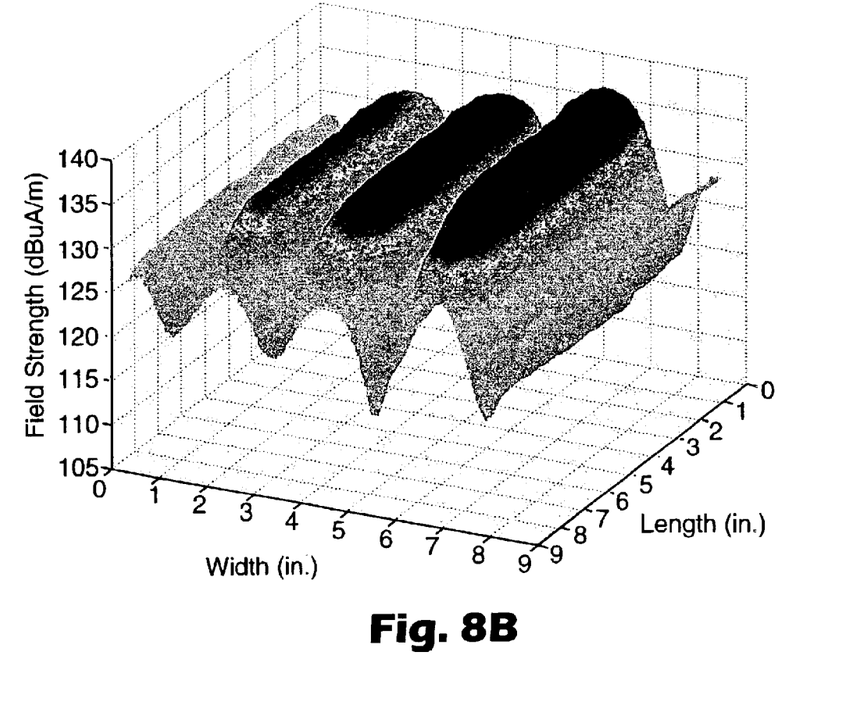
FIG. 8B is a three-dimensional graph of the magnetic field created by the antenna of FIG. 7.

60. FIG. 8B is a three-dimensional graph that illustrates the magnitude of magnetic field 70 produced by antenna 60 when outer loop 64 is powered.

Various embodiments of the invention have been described. These and other embodiments are within the scope of the following claims.

What is claimed is:

1. An antenna comprising a plurality of loops oriented to produce an electromagnetic field having a magnitude of at least an interrogation threshold of a tag for a substantial portion of an interrogation region located in a plane parallel to the antenna.

2. The antenna of claim 1, wherein the loops are formed planar to one another and are oriented to produce the magnetic field such that the magnitude within the interrogation region meets or exceeds the interrogation threshold of the tag in a direction perpendicular to an orientation of the tag.

3. The antenna of claim 2, wherein a first subset of the loops are formed in a first printed circuit board, and a second subset of the loops are formed in a second printed circuit board oriented parallel to the first printed circuit board.

4. The antenna of claim 2, wherein the loops are formed in a common layer of a printed-circuit board.

5. The antenna of claim 1, wherein a subset of at least two of the loops are selectively powered over an interrogation period to achieve the magnetic field.

6. The antenna of claim 1, wherein the loops include at least one powered loop and at least one parasitic loop.

7. The antenna of claim 1, wherein the antenna is embedded within a base of a vertical file or within a shelf.

8. The antenna of claim 7, wherein the antenna includes at least three concentric loops.

9. The antenna of claim 7, wherein the antenna includes at least fifteen concentric loops.

10. The antenna of claim 1, wherein the loops comprise concentric loops.

11. The antenna of claim 1, wherein the loops comprise a plurality of planar loops formed in multiple layers of a printed-circuit board.

12. The antenna of claim 11, wherein the loops comprise one or more powered loops within a top layer, one or more powered loops within a bottom layer, and one or more parasitic loops within a layer between the top layer and the bottom layer.

13. The antenna of claim 1, wherein the electromagnetic field formed by the antenna exceeds a threshold magnitude for energizing a radio frequency identification tag for at least 50% of the dimension of the antenna.

14. The antenna of claim 1, wherein the electromagnetic field formed by the antenna exceeds a threshold magnitude for energizing a radio frequency identification tag for at least 75% of the dimension of the antenna.

15. The antenna of claim 1, wherein the electromagnetic field formed by the antenna exceeds a threshold magnitude for energizing a radio frequency identification tag for at least 90% of the dimension of the antenna.

16. A radio frequency identification system comprising:
a storage area to store items having associated radio frequency identification tags;
an antenna proximate the storage area to produce an electromagnetic field, wherein the antenna has multiple loops; and
a radio frequency identification reader coupled to the antenna to selectively power at least one of the loops of the antenna without powering the remaining loops to communicate with the radio frequency identification tags.

17. The system of claim 16, wherein the electromagnetic field produced by the multi-loop antenna has magnitude that exceeds an interrogation threshold of the tags over a time period.

18. The system of claim 17, wherein the magnitude of the electromagnetic field meets or exceeds the interrogation threshold for a substantial portion of an interrogation region located in a plane parallel to the loops of the antenna.

19. The system of claim 16, wherein the antenna comprises at least one powered loop and at least one parasitic loop.

20. The system of claim 16, wherein the antenna comprises concentric loops.

21. The system of claim 16, wherein the antenna comprises loops formed in a common plane.

22. The system of claim 16, wherein the antenna comprises loops formed on a single layer of a printed-circuit board.

23. The system of claim 16, wherein the antenna is embedded within the storage area.

24. The system of claim 16, wherein the antenna comprises a plurality of planar loops formed in multiple layers of a printed-circuit board.

25. The system of claim 16, wherein the radio frequency identification reader selectively powers at least two of the loops of the antenna at different times during an interrogation period.

26. The system of claim 16, further comprising a file tracking system to receive the information from the radio frequency identification reader and store the information within a database.

27. The system of claim 26, further comprising a remote computer coupled to the file tracking system to present the information to a remote user.

28. The system of claim 16, wherein the storage area includes at least one of a shelving unit, a cabinet, a vertical file separator, a smart cart, and a desktop reader.

29. The system of claim 16, wherein the information received from the radio frequency identification tags includes location information for the items within the storage area.

30. The system of claim 16, wherein the items having associated radio frequency identification tags include at least one of files and documents.

31. A method comprising:
selectively powering at least one loop of a multi-loop antenna without powering the remaining loops to produce an electromagnetic field proximate to a storage area during an interrogation period; and
obtaining information during the interrogation period from one or more radio frequency identification tags fixed to items within the storage area.

32. The method of claim 31, wherein powering the multi-loop antenna includes selectively powering two or more loops of the multi-loop antenna at different times during the interrogation period to produce the electromagnetic field to have a magnitude of at least an interrogation threshold of the tags for a substantial portion of an interrogation region located in a plane parallel to the antenna.

33. The method of claim 31, wherein powering the multi-loop antenna includes powering one or more loops of the multi-loop antenna to produce the electromagnetic field to have a magnitude that meets or exceeds the interrogation threshold of the tag in a direction perpendicular to an orientation of the tag.

34. The method of claim 31, further comprising storing the information from the radio frequency identification tags within a database.

35. The method of claim 31, further comprising presenting the information from the tags to a remote user.

36. The method of claim 31, wherein obtaining information from the energized radio frequency identification tags includes obtaining location information for items to which the radio frequency identification tags are fixed, and further wherein the items include one of books, files and documents located within the storage area.

37. The method of claim 31, wherein the multi-loop antenna includes at least one powered loop and at least one parasitic loop, and powering the multi-loop antenna further comprises selectively powering the powered loop to create the electromagnetic field and induce a current in the parasitic loop via mutual coupling with the powered loop to contribute to a profile of the electromagnetic field.

38. The method of claim 31, wherein powering the multi-loop antenna further comprises:

powering a first subset of the loops to create a first electromagnetic field during a first portion of the interrogation period; and powering a second subset of the loops to create a second electromagnetic field during a second portion of the interrogation period, wherein the contributions of the first and second electromagnetic fields produce an electromagnetic field having a magnitude over the interrogation period of at least an interrogation threshold of a tag.

39. The method of claim 38, wherein the first and second portions of the interrogation period are non-overlapping.

40. The method of claim 38, wherein the first and second sets of the loops reside in a common plane.

41. The method of claim 38, wherein the first and second sets of the loops reside within multiple layers.

42. The method of claim 31, wherein a magnitude of the electromagnetic field exceeds a threshold magnitude for energizing the radio frequency identification tags for at least 50% of an interrogation region located in a plane parallel to the antenna.

43. The method of claim 31, wherein a magnitude of the electromagnetic field exceeds a threshold magnitude for energizing the radio frequency identification tags for at least 75% of an interrogation region located in a plane parallel to the antenna.

44. The method of claim 31, wherein a magnitude of the electromagnetic field exceeds a threshold magnitude for energizing the radio frequency identification tags for at least 90% of an interrogation region located in a plane parallel to the antenna.

\* \* \* \* \*